No. 857,337. PATENTED JUNE 18, 1907.
W. C. FAWKES.
WASHING MACHINE.
APPLICATION FILED JUNE 14, 1906.

2 SHEETS—SHEET 1.

WITNESSES

INVENTOR
WILBERT C. FAWKES
BY
HIS ATTORNEYS

No. 857,337. PATENTED JUNE 18, 1907.
W. C. FAWKES.
WASHING MACHINE.
APPLICATION FILED JUNE 14, 1906.

2 SHEETS—SHEET 2.

WITNESSES
INVENTOR
WILBERT C. FAWKES
BY
HIS ATTORNEYS

UNITED STATES PATENT OFFICE.

WILBERT C. FAWKES, OF MINNEAPOLIS, MINNESOTA.

WASHING-MACHINE.

No. 857,337.   Specification of Letters Patent.   Patented June 18, 1907.

Application filed June 14, 1906. Serial No. 321,683.

*To all whom it may concern:*

Be it known that I, WILBERT C. FAWKES, of Minneapolis, county of Hennepin, State of Minnesota, have invented certain new and useful Improvements in Washing-Machines, of which the following is a specification.

My invention relates to washing machines of the rotary type and the object of my invention is to provide an improved mechanism for operating the rubber head and shaft when the tub is oscillated, whereby the rubber head will be revolved at a slower speed and greater leverage will be obtained on its shaft at the beginning of the stroke.

The invention consists generally in various constructions and combinations, all as hereinafter described and particularly pointed out in the claims.

Figure 2:
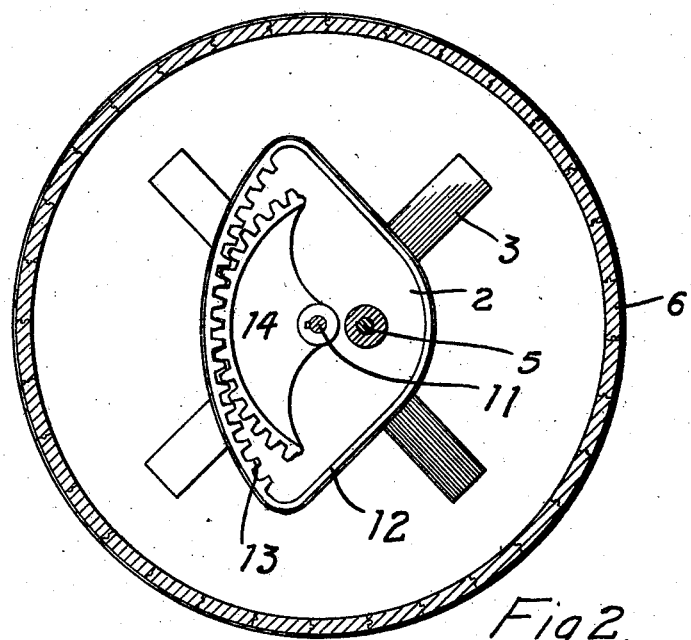
Figure 1:
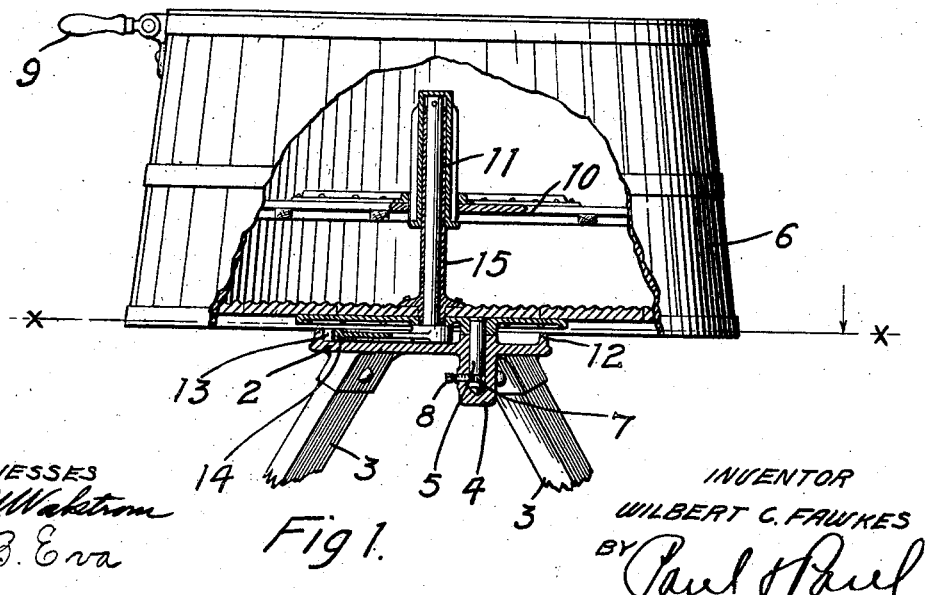
Figure 3:
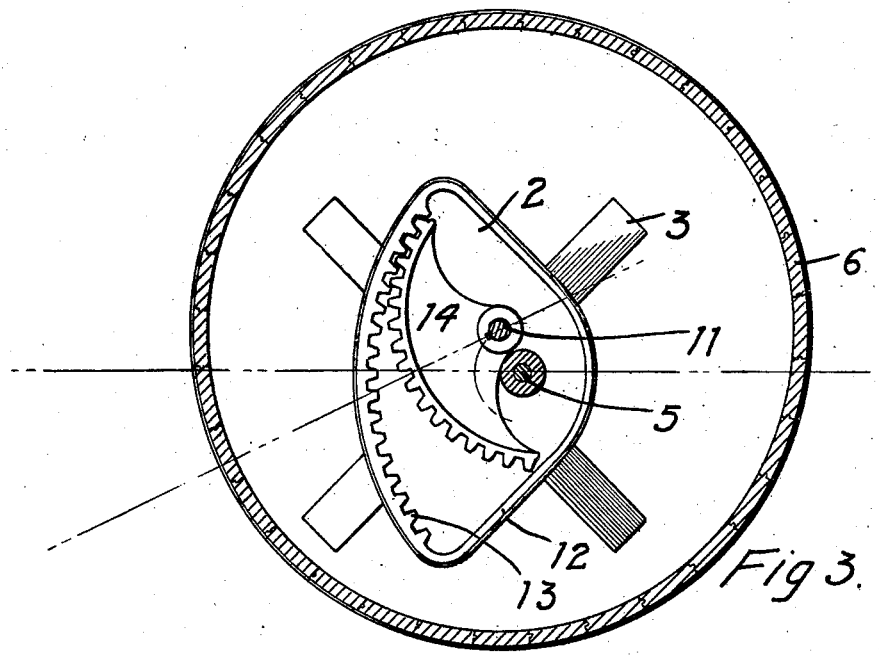
Figure 4:
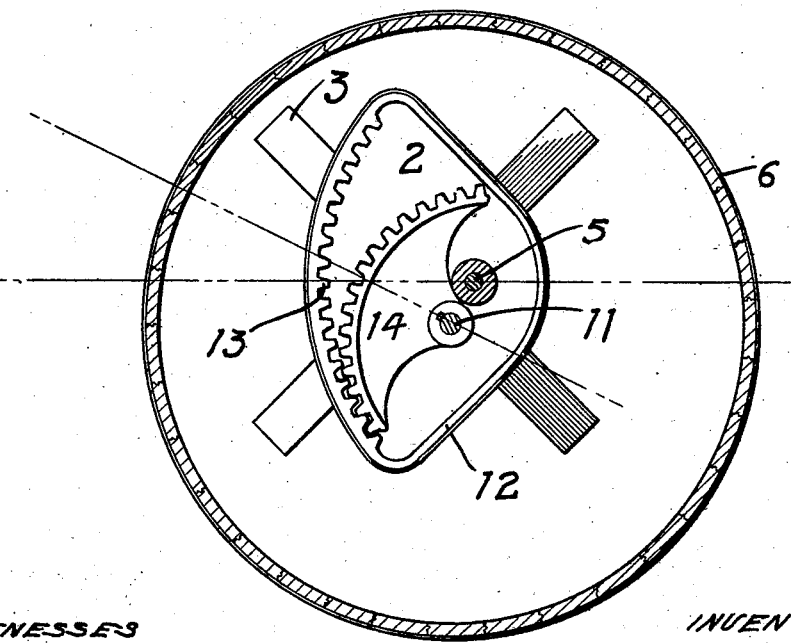

In the accompanying drawings, forming part of this specification; Figure 1 is a side elevation partially in section, of a washing machine embodying my invention. Fig. 2 is a horizontal sectional view on the line $x$—$x$ of Fig. 1. Fig. 3 is a view similar to Fig. 2 illustrating the rubber shaft operating mechanism at the beginning of its movement in one direction. Fig. 4 illustrates the said mechanism at the beginning of its stroke in the other direction, the center of the tub axis and the limit of the travel of the same on each side of the said center being indicated in Figs. 3 and 4 by dotted lines.

In the drawing, 2 represents a base plate having legs 3 and a socket 4 wherein a stud 5 eccentrically mounted on the bottom of a tub 6, is supported and adapted to revolve. The lower end of the stud has an annular groove 7 to receive a locking pin 8. The tub is of ordinary construction having an operating handle 9 and a rubber head 10 supported on a shaft 11. The base 2 is preferably of cast metal and is provided on one edge with a vertical flange 12 having on its inner face a series of gear teeth 13. A segmental gear 14 is secured on the lower end of the shaft 11 which depends through the bottom of the tub within a sleeve 15 and the teeth of said segmental gear are adapted to engage the teeth 13 as the tub is oscillated. The teeth 13 do not describe a true arc with respect to the center of the shaft 11 but the middle teeth are nearer the said shaft than those at the ends, and the segmental gear is made to correspond. That is, the distance between its axis on the stud shaft and the middle teeth is less than between the said axis and those teeth at the ends of the gear. Consequently the leverage on the rubber shaft increases toward the outer teeth of the segmental gear and decreases toward the middle teeth. This increase in leverage is utilized in starting the tub at the commencement of the washing operation and in overcoming its momentum at the ends of the stroke or the inertia at the beginning of the return stroke. The segmental gear is recessed or concaved on each side of its axis to allow it to be swung in close to the eccentric axis of the tub as indicated in Figs. 3 and 4, for the purpose of allowing the leverage to be increased and at the same time reducing the speed of revolution of the rubber shaft.

A complete gear or pinion arranged between the tub axis and the fixed gear on the base, as shown in Letters Patent of the United States, issued to me on the 26th day of May, 1903, No. 729,310, would not only prevent any increase in the leverage on the rubber shaft at the ends of the stroke, but would operate it at too high a speed. This objection to the form of gear mechanism shown in said patent, I have avoided by the use of the segmental gear and the means for increasing the leverage on the rubber shaft when the tub is at the ends of its stroke in each direction.

I do not wish to be confined in this application to the particular form of fixed gear employed or to the exact shape of segmental gear, as the same are capable of various modifications, the essential feature being the means whereby an increased leverage is obtained at the ends of the stroke with a corresponding decrease in the speed of the rubber shaft whereby the operation of the tub is made much easier without increasing materially the cost of construction of the machine.

I claim as my invention:

1. The combination, with a base having supporting legs and a series of gear teeth, of a tub having an eccentric pivot on said base, a rubber shaft centrally mounted in said tub and provided with a rubber head and a segmental gear secured on said shaft and having its teeth in engagement with the gear on said base, the end teeth of said segmental gear being a greater distance from its axis than those teeth in the middle, whereby the movement of the tub will be slower and the leverage thereon greater at the end of a stroke in one direction and the beginning of the stroke in the other direction, and the middle teeth only being in engagement with the gear on said base when said tub is in the middle of its stroke, and the end teeth only of said segmental gear being in engagement with the corresponding teeth of said base gear when said tub is at the end of its stroke, substantially as described.

2. The combination, with a base having supporting legs, and a vertical flange on one edge provided on its inner face with a series of gear teeth, of a tub having an eccentric pivot on said base, a shaft centrally mounted in said tub and depending below the same and provided with a rubber head, the lower end of said shaft being near the axis of said tub, a segmental gear secured on said shaft, the end teeth of said base gear and said segmental gear being a greater distance from the center of said shaft than the middle teeth of said gears, and the end teeth only of said segmental gear being in engagement of the stroke of said tub and said shaft describing a partial revolution around the axis of said tub, and said segmental gear having recessed or concaved edges to receive said axis and thereby permit the increase of leverage on said shaft at the ends of the stroke, substantially as described.

3. The combination, with a base having supporting legs, of a tub having an eccentric pivot on said base, a rubber shaft centrally mounted in said tub and provided with a rubber head, and a gear mechanism connecting said shaft with said base whereby said rubber shaft will be revolved when said tub is oscillated and said gear mechanism having a greater leverage on said shaft and operating it at a slower speed at the beginning of the stroke of said tub in each direction than during the middle part of the stroke of said tub, substantially as described.

In witness whereof, I have hereunto set my hand this 7th day of June 1906.

WILBERT C. FAWKES.

Witnesses:
   RICHARD PAUL,
   J. B. EVA.